US010309523B2

(12) United States Patent
Kawarazaki et al.

(10) Patent No.: US 10,309,523 B2
(45) Date of Patent: Jun. 4, 2019

(54) DRIVING FORCE TRANSMISSION DEVICE OF VEHICLE

(71) Applicant: SUBARU CORPORATION, Tokyo (JP)

(72) Inventors: Hirofumi Kawarazaki, Tokyo (JP); Satoshi Akimoto, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 15/486,379

(22) Filed: Apr. 13, 2017

(65) Prior Publication Data

US 2017/0343100 A1 Nov. 30, 2017

(30) Foreign Application Priority Data

May 30, 2016 (JP) .................... 2016-107354

(51) Int. Cl.
*F16C 33/66* (2006.01)
*F16K 99/00* (2006.01)
(Continued)

(52) U.S. Cl.
CPC ..... *F16H 57/0471* (2013.01); *F16C 33/6677* (2013.01); *F16H 57/043* (2013.01);
(Continued)

(58) Field of Classification Search
CPC ............... F16H 57/0423; F16H 57/043; F16H 57/0457; F16H 57/0426; F16H 57/0427;
(Continued)

(56) References Cited

U.S. PATENT DOCUMENTS

| 3,131,582 | A | * | 5/1964 | Kelbel | F16D 25/02 184/6.12 |
| 4,479,682 | A | * | 10/1984 | Olivier | F16C 33/6681 384/475 |
| 4,501,167 | A | * | 2/1985 | Saito | F16H 57/02 184/6.12 |
| 4,590,820 | A | * | 5/1986 | Hambric | F16H 1/22 74/467 |

(Continued)

FOREIGN PATENT DOCUMENTS

CN 103518080 A 1/2014
DE 102014207317 A1 10/2015
(Continued)

OTHER PUBLICATIONS

Office Action for CN Patent Application No. 201710265263.9, dated Jan. 31, 2019, 06 pages of Office Action and pages 07 of English Translation.

*Primary Examiner* — Jake Cook
*Assistant Examiner* — Bobby Rushing, Jr.
(74) *Attorney, Agent, or Firm* — Chip Law Group (57) ABSTRACT

A driving force transmission device of a vehicle includes: a main body; a carrying up gear; a drive shaft; and a blocking member. A gear that transmits a driving force to the vehicle is housed in the main body. The carrying up gear carries up a lubricating oil stored in the main body. The drive shaft has, in the shaft, a lubricating oil storage space into which the carried up lubricating oil is introduced and a lubricating oil discharge hole through which the lubricating oil in the lubricating oil storage space is supplied to a bearing unit. The blocking member blocks the lubricating oil discharge hole in accordance with a rotational speed of the drive shaft.

17 Claims, 7 Drawing Sheets

(51) Int. Cl.
*F16H 57/04* (2010.01)
*F16K 15/02* (2006.01)
*F16K 31/44* (2006.01)
*B60K 1/00* (2006.01)

(52) U.S. Cl.
CPC ....... *F16H 57/045* (2013.01); *F16H 57/0426* (2013.01); *F16H 57/0435* (2013.01); *F16H 57/0457* (2013.01); *F16K 15/026* (2013.01); *F16K 31/44* (2013.01); *F16K 99/0063* (2013.01); *B60K 1/00* (2013.01); *F16C 2361/61* (2013.01); *F16H 57/0423* (2013.01); *F16H 57/0483* (2013.01); *F16H 57/0495* (2013.01)

(58) Field of Classification Search
CPC ............. F16H 57/0471; F16H 33/6674; F16C 33/6659; F16C 33/6677; F16C 2361/61; F16K 15/025; F16K 15/026; F16K 15/033; F16K 15/044; F16K 15/063; F16K 99/0063
See application file for complete search history.

(56) References Cited

U.S. PATENT DOCUMENTS

| | | | |
|---|---|---|---|
| 4,987,974 A * | 1/1991 | Crouch | F16H 57/043 |
| | | | 184/11.1 |
| 9,447,863 B2 * | 9/2016 | Tonokura | F16D 13/74 |
| 2013/0327595 A1 | 12/2013 | Moriguchi et al. | |
| 2014/0219761 A1 | 8/2014 | Moriguchi et al. | |
| 2017/0089449 A1 * | 3/2017 | Olson | F16H 57/0431 |
| 2017/0108109 A1 * | 4/2017 | Itoo | F16H 57/0434 |
| | | | 57/434 |

FOREIGN PATENT DOCUMENTS

| | | | | | |
|---|---|---|---|---|---|
| EP | 2602515 A1 | * | 6/2013 | ............ | F16H 57/042 |
| FR | 3056666 A1 | * | 3/2018 | ......... | F16H 57/0423 |
| JP | 4337153 | * | 11/1992 | ............. | F16H 57/02 |
| JP | 2001190042 A | * | 7/2001 | ......... | F16H 57/0428 |
| JP | 2007057093 A | | 3/2007 | | |
| JP | 2010174917 A | * | 8/2010 | | |
| JP | 2012017764 A | | 1/2012 | | |
| JP | 2014-095418 A | | 5/2014 | | |
| WO | WO-2012159787 A1 | * | 11/2012 | ............... | B60K 1/00 |

* cited by examiner

DRIVING FORCE TRANSMISSION DEVICE OF VEHICLE

CROSS-REFERENCE TO RELATED APPLICATIONS

The present application claims priority from Japanese Patent Application No. 2016-107354 filed on May 30, 2016, the entire contents of which are hereby incorporated by reference.

BACKGROUND

1. Technical Field

The present invention relates to a driving force transmission device of a vehicle.

2. Related Art

In the related art, for instance, in Japanese Unexamined Patent Application Publication (JP-A) No. 2007-057093, a configuration in which, in a decelerator that uses an electric motor as a driving source and includes a differential gear and a parallel shaft, a bearing is lubricated in an oil passage through a drive shaft including a gear from a catch tank provided above the gear is disclosed.

In addition, in JP-A No. 2012-017764, a configuration in which, in a lubrication structure of a planetary gear mechanism that is used for a drive unit configured to distribute a driving force of a motor and an engine in a hybrid vehicle, oil trapped around the planetary gear lubricates a bearing through an opening guide (a liquid reservoir) of a shaft for the planetary gear is disclosed.

In a unit including a rotating member such as a gear mechanism, if there is insufficient lubricating oil for lubricating the rotating member, there is a possibility of defects such as burning of a gear. In particular, in a method in which a lubricating oil is dispersed by being carried up by a gear and the lubricating oil is supplied, since an amount of lubricating oil dispersed depends on a rotational speed, an amount of lubricating oil dispersed particularly during low speed running decreases and a bearing and the like on a motor shaft at a distance from an oil surface are likely to be insufficiently lubricated. Accordingly, it is desirable to appropriately supply a lubricating oil in accordance with running conditions.

However, in the technology described in JP-A No. 2007-057093, supply of a lubricating oil in accordance with running conditions is not considered at all. In addition, in the technology described in JP-A No. 2012-017764, a lubricating oil is supplied by an oil pump and when lubricating oil is dispersed by carrying up, optimal supply of the lubricating oil in accordance with running conditions is not considered at all.

SUMMARY OF THE INVENTION

It is desirable to provide a novel and improved driving force transmission device of a vehicle that makes it possible to optimally perform lubrication in accordance with running conditions of the vehicle.

An aspect of the present invention provides a driving force transmission device of a vehicle, the driving force transmission device including: a main body in which a gear configured to transmit a driving force to the vehicle is housed; a carrying up gear configured to carry up a lubricating oil stored in the main body; a drive shaft that has, in the shaft, a lubricating oil storage space into which the carried up lubricating oil is introduced and a lubricating oil discharge hole through which the lubricating oil in the lubricating oil storage space is supplied to a bearing unit; and a blocking member configured to block the lubricating oil discharge hole in accordance with a rotational speed of the drive shaft.

The blocking member may open the lubricating oil discharge hole when the drive shaft rotates at a low speed and supply the lubricating oil in the lubricating oil storage space to the bearing unit, and block the lubricating oil discharge hole when the drive shaft rotates at a high speed and accumulate the lubricating oil in the lubricating oil storage space.

The blocking member may be disposed inside the lubricating oil storage space to block the lubricating oil discharge hole with a centrifugal force generated by a rotation of the drive shaft. The driving force transmission device may include an elastic member configured to perform biasing in a direction in which the blocking member is separated from the lubricating oil discharge hole.

The elastic member may include a conical spring.

The lubricating oil storage space may have an end that is open in an axial direction of the drive shaft. The driving force transmission device may include a rib on a wall surface of the main body, the rib guiding the carried up lubricating oil to the end.

The bearing unit may include a bearing. The driving force transmission device may include an annular bearing holder that protrudes from the wall surface of the main body and holds the bearing. The carried up lubricating oil may be introduced into a space inside the bearing holder from an opening provided in the bearing holder and be introduced into the lubricating oil storage space from the end.

The driving force transmission device of a vehicle may include: a guide member configured to guide the lubricating oil introduced into the space inside the bearing holder from the opening to an inside of the lubricating oil storage space.

The gear may include a helical gear.

DETAILED DESCRIPTION

Hereinafter, preferred examples of the present invention will be described in detail with reference to the appended drawings. Note that, in this specification and the appended drawings, structural elements that have substantially the same function and structure are denoted with the same reference numerals, and repeated description of these structural elements is omitted.

Figure 1:
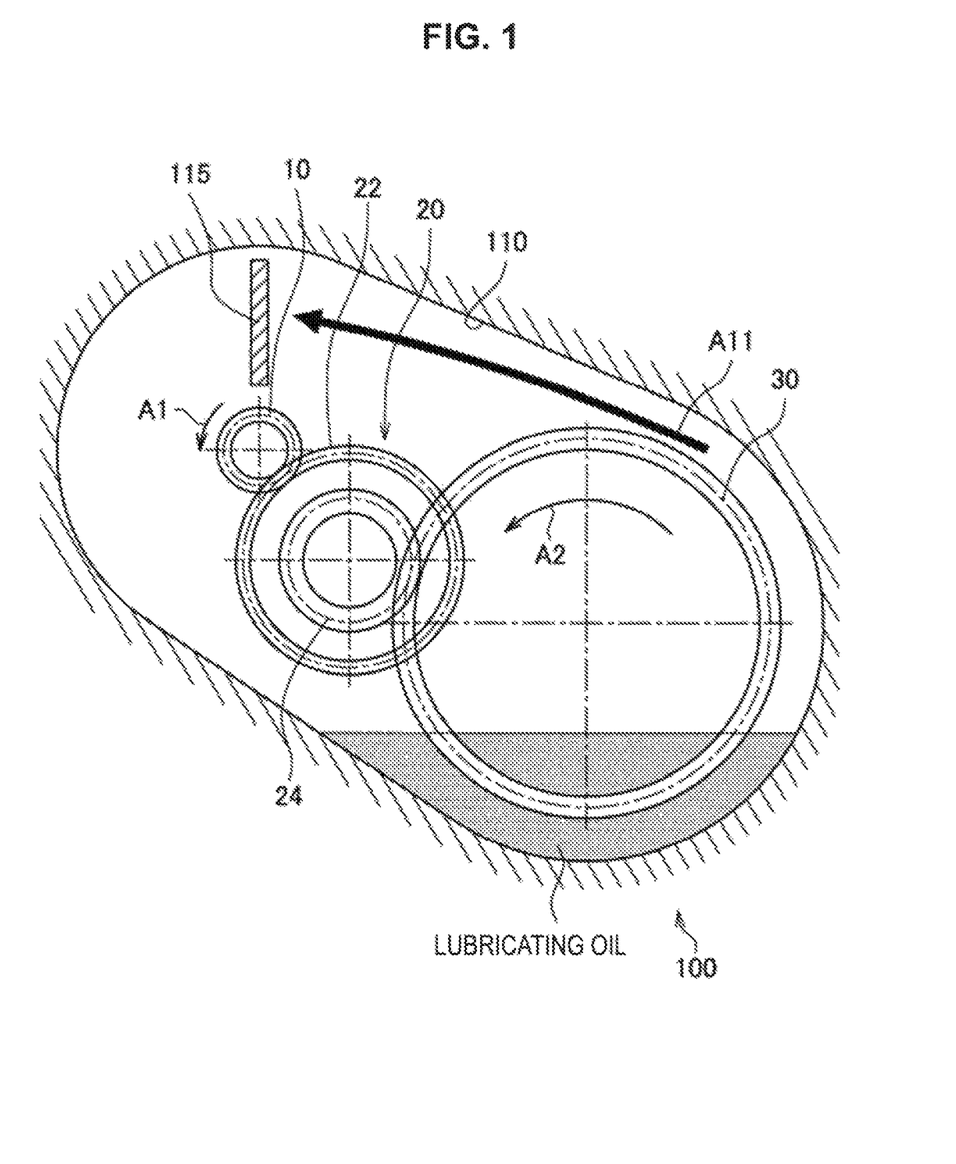
FIG. 1 is a schematic cross-sectional view illustrating a configuration of a gear box of a vehicle according to an example of the present invention and the vicinity thereof.
Figure 2:
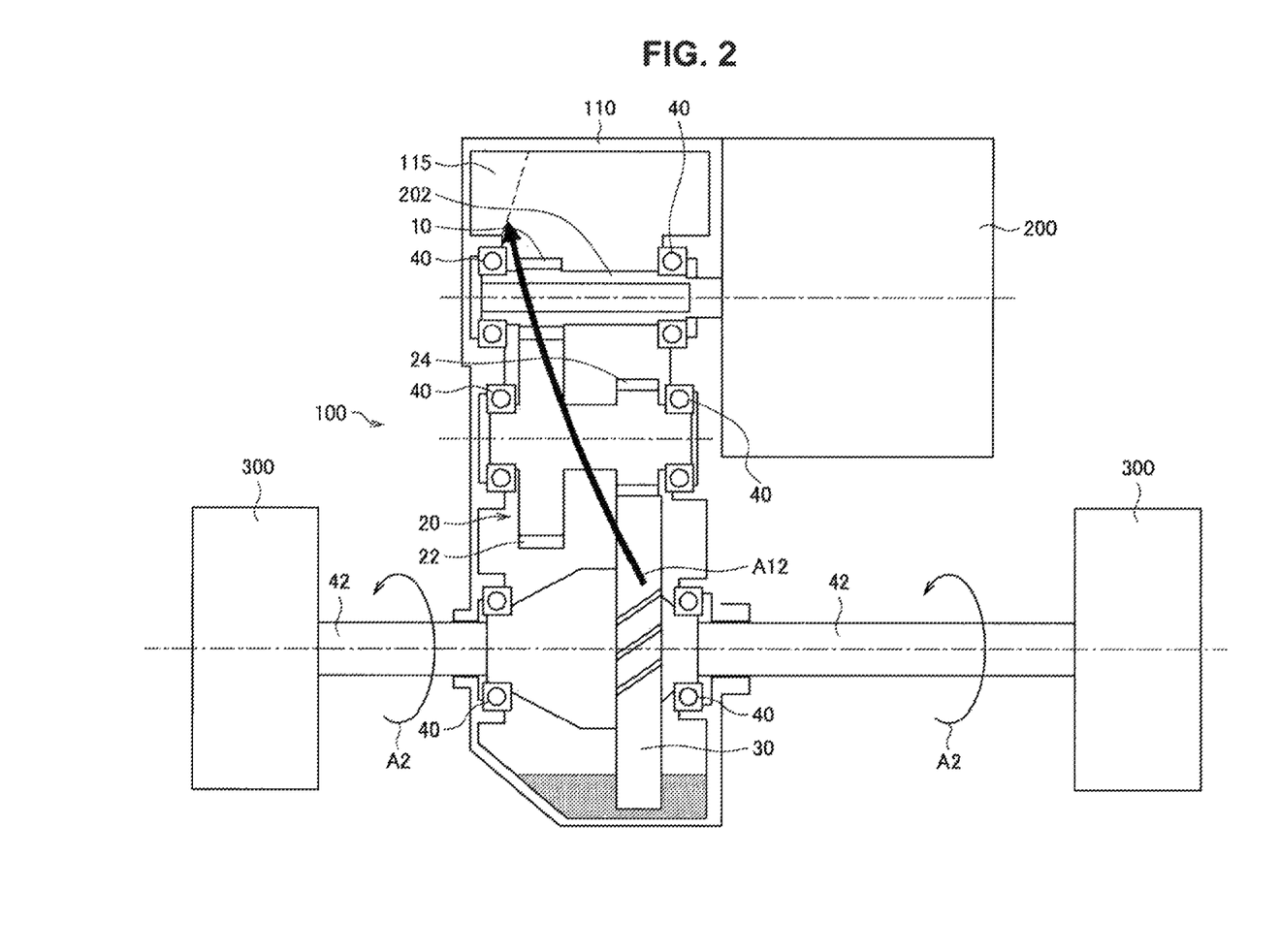
FIG. 2 is a schematic cross-sectional view illustrating a configuration of a gear box of a vehicle according to the example of the present invention and the vicinity thereof.

FIG. 1 and FIG. 2 are schematic cross-sectional views illustrating a configuration of a gear box 100 of a vehicle according to an example of the present invention and the vicinity thereof. In one example, the gear box 100 may serve as a "driving force transmission device." As an instance, the gear box 100 is a parallel shaft using a helical gear and is a decelerator of an EV vehicle which performs lubrication with an oil bath splash scheme.

FIG. 1 illustrates a state in which the gear box 100 is viewed in a direction of rotation axes of gears. In addition, FIG. 2 schematically illustrates a state in which the inside of the gear box 100 is viewed from the upper side in FIG. 1 in a direction orthogonal to rotation axes of gears. As illustrated in FIG. 1 and FIG. 2, the gear box 100 includes a gear 10, a reduction gear 20, and a gear 30. The reduction gear 20 includes a large diameter gear 22 and a small diameter gear 24. The gears are supported by a main body 110 of the gear box 100 through a bearing 40. While the gears include helical gears in the configuration instance illustrated in FIG. 1 and FIG. 2, the gears may include spur gears.

As illustrated in FIG. 1 and FIG. 2, the gear 10 is engaged with the large diameter gear 22, and the small diameter gear 24 is engaged with the gear 30. In addition, as illustrated in FIG. 2, the gear 10 is integrally formed with a drive shaft 202 of a prime mover (motor) 200 and the gear 30 is integrally formed with a drive shaft 42 of a wheel 300. In such a configuration, when the drive shaft 202 and the gear 10 rotate in a direction of an arrow A1 in FIG. 1 due to the driving of the prime mover 200, the reduction gear 20 rotates as the gear 10 rotates, the gear 30 also rotates in a direction of an arrow A2, and the wheel 300 is driven.

FIG. 1 illustrates a state during high speed running. As illustrated in FIG. 1, lubricating oil accumulates in a bottom of the gear box 100 and a part of the gear 30 is immersed in the lubricating oil. When the gear 30 rotates in a direction of the arrow A2, lubricating oil is carried up by the gear 30 and is supplied to the gear 10, the gear 20, the gear 30 and the bearing 40. Therefore, it is possible to lubricate the gears and the bearing 40. In this manner, the gear 30 functions as a carrying up gear configured to carry up lubricating oil.

In a gear of an oil bath splash scheme illustrated in FIG. 1 and FIG. 2, a direction in which lubricating oil is dispersed by carrying up is originally a circumferential tangential direction in a rotation direction of the gear 30, but the helical gear has a twist angle. Therefore, lubricating oil is dispersed in a resultant force direction (a direction of an arrow A12 illustrated in FIG. 2) from an axial direction and a circumferential tangential direction of a gear along a twist angle. In addition, since an amount of lubricating oil dispersed is proportional to a peripheral speed of a gear, the dispersing amount increases as a vehicle speed increases. Therefore, an amount of lubricating oil dispersed increases during high speed running, and the gear 10, the gear 20, the gear 30 and the bearing 40 can be sufficiently lubricated with the dispersed lubricating oil.

Figure 3:
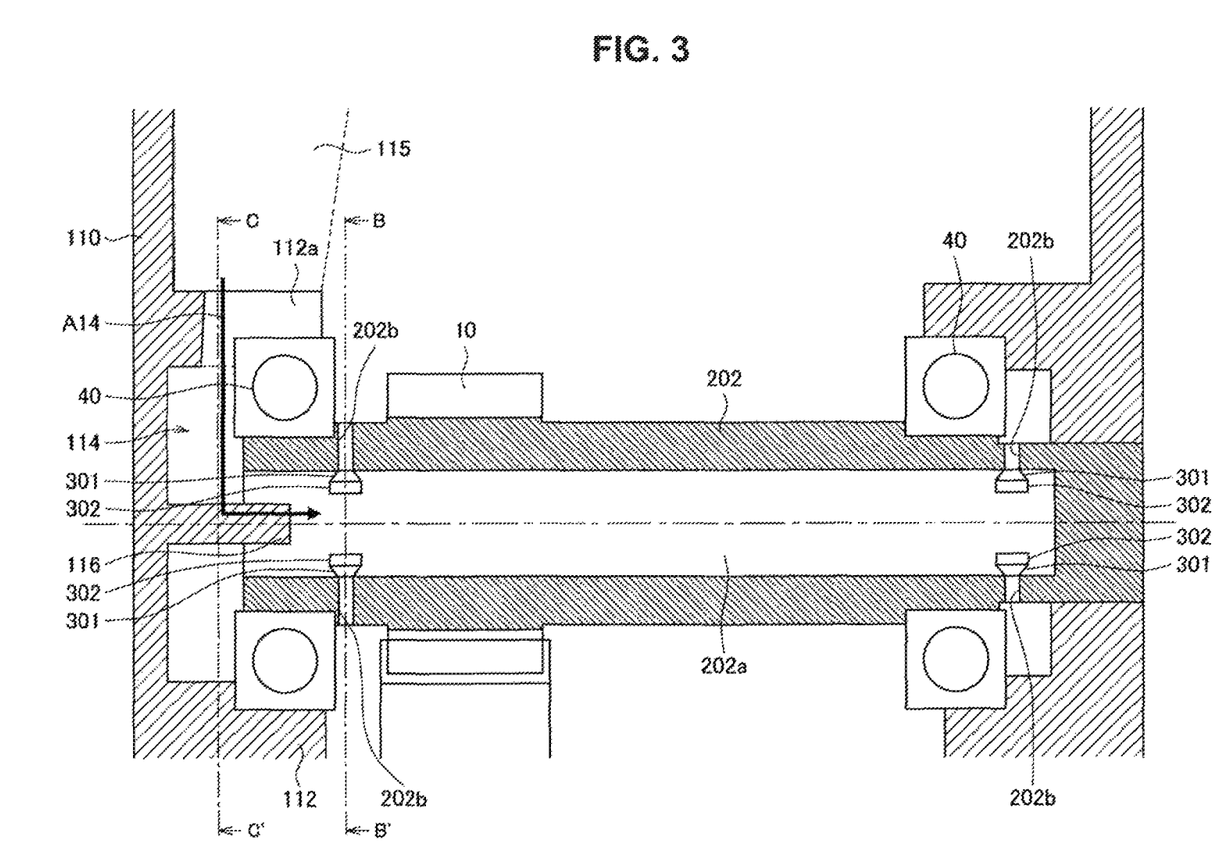
FIG. 3 is a schematic cross-sectional view illustrating an enlarged vicinity of a gear and a drive shaft of FIG. 2.
Figure 4:
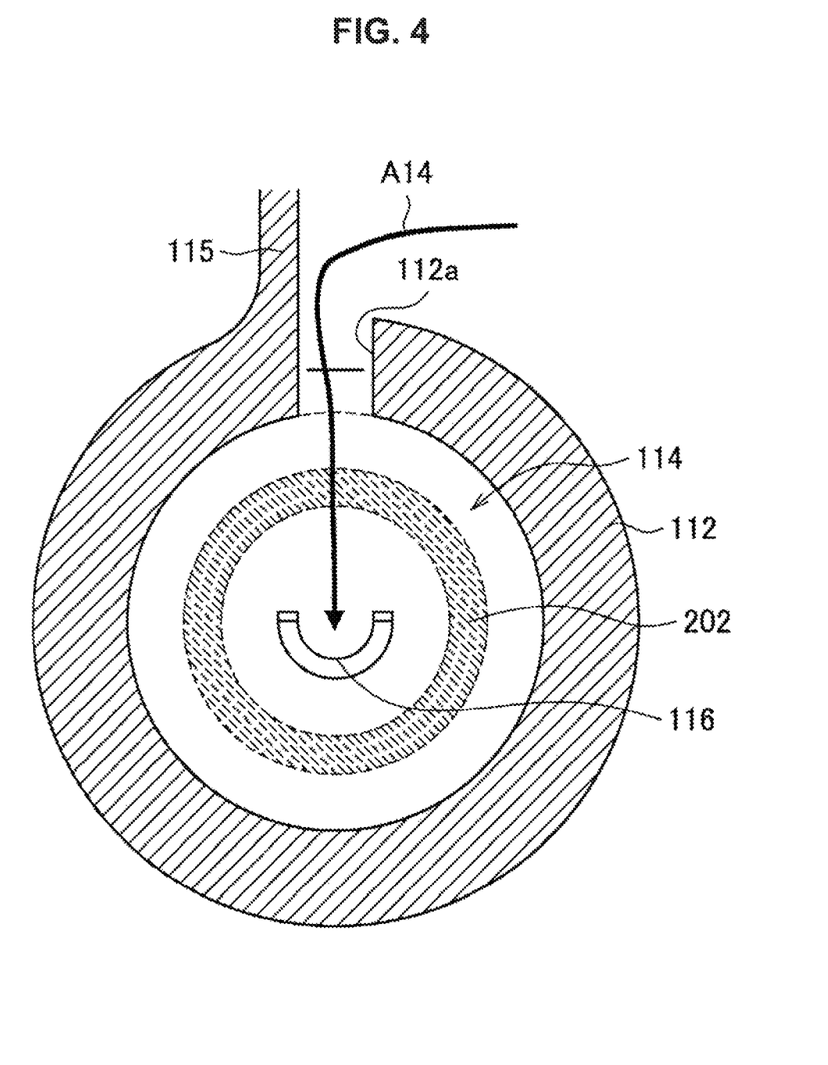
FIG. 4 is a schematic cross-sectional view illustrating a cross section along a dashed line C-C' in FIG. 3.
Figure 5:
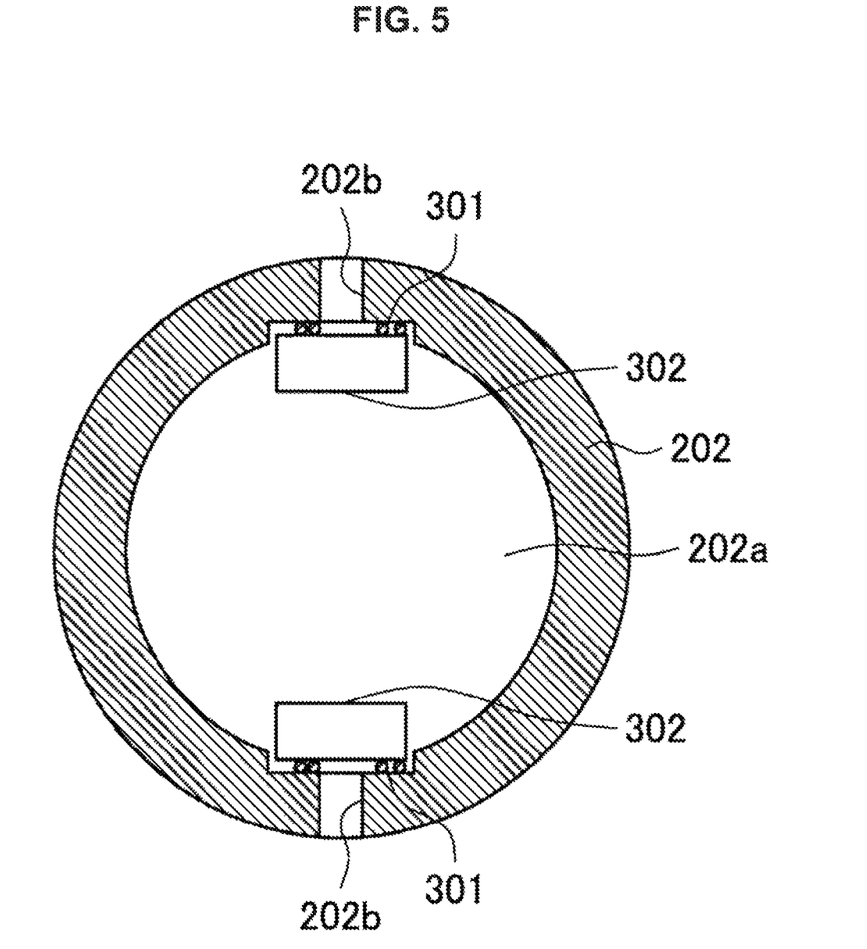
FIG. 5 is a schematic cross-sectional view illustrating a cross section along a dashed line B-B' in FIG. 3 and is a schematic diagram during high speed running.

FIG. 3 is a schematic cross-sectional view illustrating an enlarged vicinity of the gear 10 and the drive shaft 202 in FIG. 2. In addition, FIG. 4 is a schematic cross-sectional view illustrating a cross section along a dashed line C-C' in FIG. 3. In addition, FIG. 5 is a schematic cross-sectional view illustrating a cross section along a dashed line B-B' in FIG. 3 and illustrates a state during high speed running. As illustrated in FIG. 3 and FIG. 4, in the vicinity of the bearing 40 disposed on an end of the gear 10 of the drive shaft 202, a bearing holder 112 into which the bearing 40 is inserted is provided. The bearing holder 112 is integrally formed with the main body 110. A notch is provided in the upper part of the bearing holder 112 and an opening 112a is formed by the notch. The opening 112a communicates with a space 114 formed by the bearing holder 112, the main body 110 and the bearing 40.

As illustrated in FIG. 4, a rib 115 extends vertically upward from the upper part of the bearing holder 112. The rib 115 is disposed adjacent to the opening 112a. In addition, a guide 116 is provided at a position corresponding to the center of the drive shaft 202 inside the bearing holder 112. The guide 116 has a gutter-like shape, is integrally formed with the main body 110, and is provided below the opening 112a.

As illustrated in FIG. 3, the drive shaft 202 has a hollow structure and a lubricating oil storage space 202a. The guide 116 is inserted into the lubricating oil storage space 202a inside the drive shaft 202 from the main body 110.

Lubricating oil dispersed in a direction of the arrow A12 in FIG. 2 during high speed running is introduced into the space 114 through the rib 115 and the opening 112a in a direction of an arrow A14 as illustrated in FIG. 3. The lubricating oil introduced into the space 114 is introduced into the drive shaft 202 from an end of the drive shaft 202 along the guide 116 disposed below the opening 112a and is supplied to the lubricating oil storage space 202a in the shaft.

As illustrated in FIG. 5, a lubricating oil discharge hole 202b is provided in the drive shaft 202. The lubricating oil storage space 202a inside the drive shaft 202 and an external area communicate through the lubricating oil discharge hole 202b.

A conical spring 301 and a weight 302 are provided in each lubricating oil discharge hole 202b. In one example, the conical spring 301 may serve as an "elastic member." In one example, the weight 302 may serve as a "blocking member." The conical spring 301 includes a compression spring which has one end fixed to an inner circumferential surface of the drive shaft 202 and the other end fixed to the weight 302. Also, the conical spring 301 is an instance of an elastic member and may include another spring.

During high speed running as illustrated in FIG. 5, a rotational speed of the drive shaft 202 is high and a centrifugal force applied to the weight 302 increases. When the centrifugal force applied to the weight 302 exceeds an elastic force (spring force) with which the conical spring 301 is compressed, the conical spring 301 is compressed and the weight 302 and the conical spring 301 block the lubricating oil discharge hole 202b. More specifically, when the centrifugal force applied to the weight 302 is greater than an elastic force with which the conical spring 301 is compressed, since a force with which the weight 302 is brought into close contact with an inner surface of the drive shaft 202 is applied and adjacent wires constituting the conical spring 301 come in close contact with each other, the lubricating oil discharge hole 202b is blocked. Accordingly, the lubricating oil introduced into the lubricating oil storage space 202a remains in the drive shaft 202.

Figure 6:
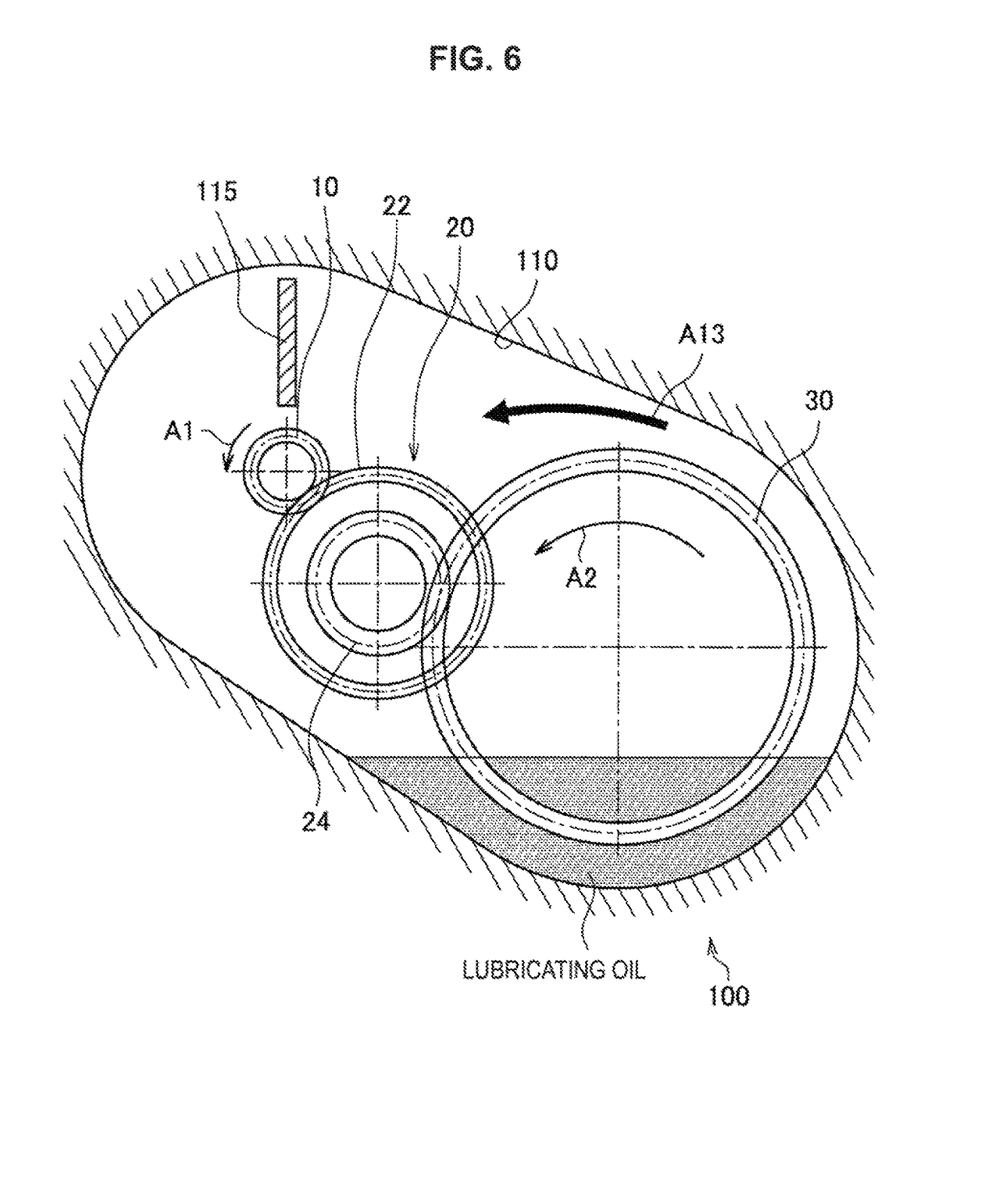
FIG. 6 is a schematic diagram illustrating a state in which a gear box is viewed in directions of rotation axes of gears similarly to FIG. 1 and is a schematic diagram during low speed running.
Figure 7:
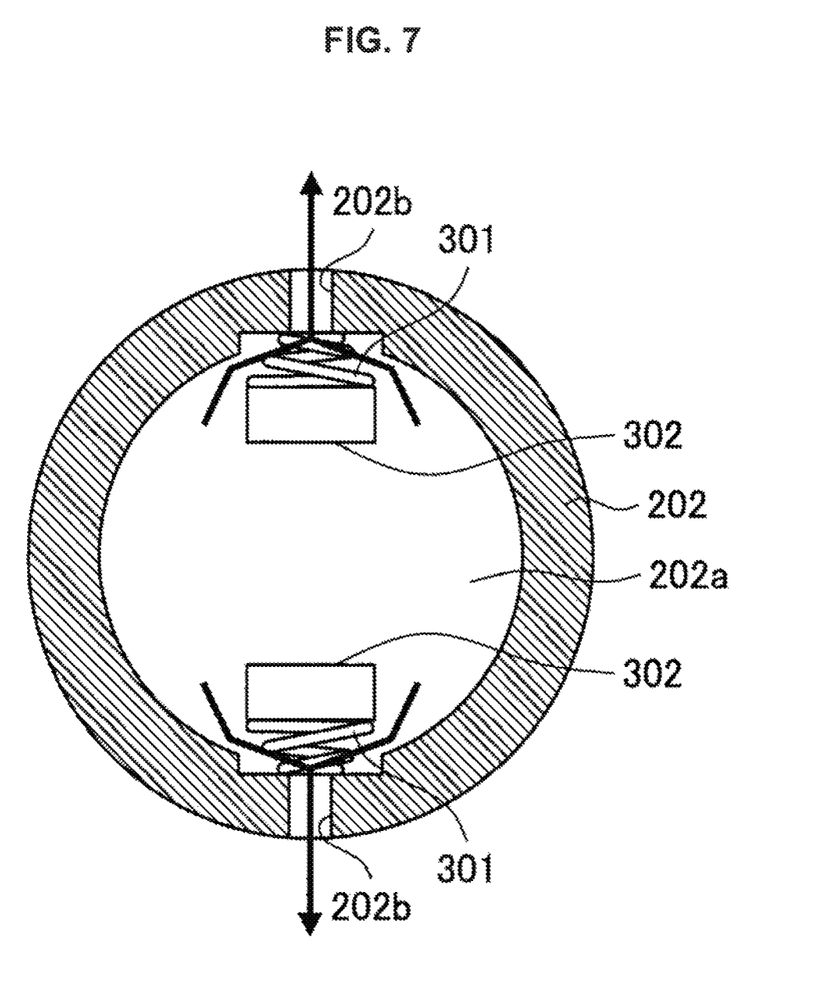
FIG. 7 is a schematic cross-sectional view illustrating a cross section along a dashed line B-B' in FIG. 3 similarly to FIG. 5 and is a schematic diagram during low speed running.

FIG. 6 is a schematic diagram illustrating a state in which the gear box 100 is viewed in a direction of rotation axes of gears similarly to FIG. 1 and illustrates a state during low speed running. In addition, FIG. 7 is a schematic cross-sectional view illustrating a cross section along a dashed line B-B' in FIG. 3 similarly to FIG. 5 and illustrates a state during low speed running. During low speed running, since the gear 30 rotates slowly, an amount of lubricating oil dispersed by being carried up by the gear 30 is small and it is difficult to lubricate a part away from an oil surface of the lubricating oil. That is, the lubricating oil is not able to be dispersed to the rib 115 positioned above the drive shaft 202 and the opening 112a of the bearing holder 112.

On the other hand, during high speed running, a centrifugal force applied to the weight 302 is greater than an elastic force of the conical spring 301 and the weight 302 and the conical spring 301 block the lubricating oil discharge hole 202b. However, during low speed running, a centrifugal force applied to the weight 302 decreases and the weight moves to the center of the drive shaft 202 as illustrated in FIG. 7. Therefore, a state in which the weight 302 and the conical spring 301 block the lubricating oil discharge hole 202b is released, and the lubricating oil discharge hole 202b is opened. As a result, during high speed running, the lubricating oil accumulated in the lubricating oil storage space 202a is discharged from the lubricating oil discharge hole 202b and is supplied to the bearings 40 at both ends of the drive shaft 202.

As described above, in the present example, the lubricating oil storage space 202a for in-shaft lubrication is provided in the drive shaft 202 which is relatively distant from an oil surface of the lubricating oil, and the lubricating oil discharge hole 202b is opened to the bearing 40 supporting the drive shaft 202 from the lubricating oil storage space 202a. During low speed running, when the lubricating oil discharge hole 202b is opened, the lubricating oil is discharged from the lubricating oil storage space 202a and is supplied to the bearing 40. In addition, during high speed running, the lubricating oil dispersed by being carried up by the gear 30 is directly supplied to the bearing 40 and is supplied to the lubricating oil storage space 202a. In addition, during high speed running, when the lubricating oil discharge hole 202b is blocked, discharge of the lubricating oil from the lubricating oil storage space 202a stops and the lubricating oil accumulates in the lubricating oil storage space 202a.

In addition, the conical spring 301 and the weight 302 are attached to the inner side of the lubricating oil discharge hole 202b. During low speed running, since a centrifugal force applied to the weight 302 is equal to or less than a spring force of the conical spring 301, the weight is positioned at the center of the drive shaft 202 and the lubricating oil discharge hole 202b is opened. In addition, during high speed running, a centrifugal force applied to the weight 302 is greater than a spring force of the conical spring 301 and it is possible to block the lubricating oil discharge hole 202b by the weight 302 and the conical spring 301.

In addition, during high speed running, the dispersed lubricating oil flows into the space 114 on a rear surface of the bearing 40 through the rib 115 and is supplied to the lubricating oil storage space 202a inside the drive shaft 202 through the guide 116.

During low speed running, a proportion of lubricating oil dispersed is small. Particularly, it is difficult to supply lubricating oil to a place which is relatively distant from an oil surface of a lubricating oil through dispersing. In addition, during low speed running, since an amount of heat generated by the bearing 40 is also low, an amount of lubricating oil supplied is smaller than that during high speed running. Therefore, during low speed running, when the lubricating oil discharge hole 202b is opened, the bearing 40 is lubricated with the lubricating oil accumulated in the lubricating oil storage space 202a. On the other hand, during high speed running, a proportion of lubricating oil dispersed is large, and the bearing 40 can be lubricated with the dispersed lubricating oil. Therefore, the lubricating oil discharge hole 202b is blocked and the lubricating oil accumulates in the lubricating oil storage space 202a. The amount of lubricating oil which decreases in the lubricating oil storage space 202a during low speed running is restored to its original state during high speed running, and a concern of there being insufficient lubricating oil during low speed running can be eliminated.

As described above, according to the present example, when lubricating oil accumulates in the lubricating oil storage space 202a during high speed running and is discharged during low speed running, a structure in which insufficient lubrication does not occur in all speed ranges such as during low speed running and during high speed running can be obtained and lubrication of the bearing 40 can be preserved. Therefore, it is not necessary to forcibly perform lubrication using an oil pump or the like and it is possible to ensure necessary lubrication with a simple structure.

Although the preferred examples of the present invention have been described in detail with reference to the appended drawings, the present invention is not limited thereto. It is obvious to those skilled in the art that various modifications or variations are possible insofar as they are within the technical scope of the appended claims or the equivalents thereof. It should be understood that such modifications or variations are also within the technical scope of the present invention.

As described above, according to the present invention, it is possible to provide a driving force transmission device of a vehicle that makes it possible to optimally perform lubrication in accordance with running conditions of the vehicle.

The invention claimed is:

1. A driving force transmission device of a vehicle, the driving force transmission device comprising:
    a main body in which a driving force gear configured to transmit a driving force to the vehicle is housed;
    a carrying up gear configured to carry up a lubricating oil stored in the main body;
    a drive shaft that has therein a lubricating oil storage space into which the carried up lubricating oil is introduced and a lubricating oil discharge hole through which the lubricating oil in the lubricating oil storage space is supplied to a bearing unit; and
    a blocking member configured to block the lubricating oil discharge hole in accordance with a rotational speed of the drive shaft,
    wherein the blocking member opens the lubricating oil discharge hole when the drive shaft rotates at a low speed, and blocks the lubricating oil discharge hole when the drive shaft rotates at a high speed.

2. The driving force transmission device of the vehicle according to claim 1, wherein
    when the blocking member opens the lubricating oil discharge hole, the lubricating oil in the lubricating oil storage space is supplied to the bearing unit, and
    when the blocking member blocks the lubricating oil discharge hole, the lubricating oil is accumulated within the lubricating oil storage space.

3. The driving force transmission device of the vehicle according to claim 2, wherein
    the blocking member is disposed inside the lubricating oil storage space to block the lubricating oil discharge hole with a centrifugal force generated by a rotation of the drive shaft, and
    the driving force transmission device comprises an elastic member configured to perform biasing in a direction in which the blocking member is separated from the lubricating oil discharge hole.

4. The driving force transmission device of the vehicle according to claim 3, wherein the elastic member comprises a conical spring.

5. The driving force transmission device of the vehicle according to claim 2, wherein
the lubricating oil storage space has an end that is open in an axial direction of the drive shaft, and
the driving force transmission device comprises a rib on a wall surface of the main body, the rib guiding the carried up lubricating oil to the end.

6. The driving force transmission device of the vehicle according to claim 5, wherein
the bearing unit comprises a bearing,
the driving force transmission device comprises an annular bearing holder that protrudes from the wall surface of the main body and holds the bearing, and
the carried up lubricating oil is introduced into a space inside the annular bearing holder from an opening provided in the annular bearing holder and is introduced into the lubricating oil storage space from the end.

7. The driving force transmission device of the vehicle according to claim 6, comprising:
a guide member configured to guide the lubricating oil introduced into the space inside the annular bearing holder from the opening to an inside of the lubricating oil storage space.

8. The driving force transmission device of the vehicle according to claim 2, wherein the driving force gear comprises a helical gear.

9. The driving force transmission device of the vehicle according to claim 3, wherein the driving force gear comprises a helical gear.

10. The driving force transmission device of the vehicle according to claim 1, wherein
the blocking member is disposed inside the lubricating oil storage space to block the lubricating oil discharge hole with a centrifugal force generated by a rotation of the drive shaft, and
the driving force transmission device comprises an elastic member configured to perform biasing in a direction in which the blocking member is separated from the lubricating oil discharge hole.

11. The driving force transmission device of the vehicle according to claim 10, wherein the elastic member comprises a conical spring.

12. The driving force transmission device of the vehicle according to claim 10, wherein the driving force gear comprises a helical gear.

13. The driving force transmission device of the vehicle according to claim 1, wherein
the lubricating oil storage space has an end that is open in an axial direction of the drive shaft, and
the driving force transmission device comprises a rib on a wall surface of the main body, the rib guiding the carried up lubricating oil to the end.

14. The driving force transmission device of the vehicle according to claim 13, wherein
the bearing unit comprises a bearing,
the driving force transmission device comprises an annular bearing holder that protrudes from the wall surface of the main body and holds the bearing, and
the carried up lubricating oil is introduced into a space inside the annular bearing holder from an opening provided in the annular bearing holder and is introduced into the lubricating oil storage space from the end.

15. The driving force transmission device of the vehicle according to claim 14, comprising:
a guide member configured to guide the lubricating oil introduced into the space inside the annular bearing holder from the opening to an inside of the lubricating oil storage space.

16. The driving force transmission device of the vehicle according to claim 1, wherein the driving force gear comprises a helical gear.

17. The driving force transmission device of the vehicle according to claim 1, wherein the carrying up gear comprises a helical gear.

* * * * *